United States Patent [19]  
Sheridan

[11] 3,920,796  
[45] Nov. 18, 1975

[54] METHOD OF PREPARING PURIFIED PHOSPHATES FROM IMPURE PHOSPHORIC ACID

[75] Inventor: Richard C. Sheridan, Sheffield, Ala.

[73] Assignee: Tennessee Valley Authority, Muscle Shoals, Ala.

[22] Filed: Aug. 31, 1973

[21] Appl. No.: 393,413

Related U.S. Application Data

[63] Continuation of Ser. No. 335,337, Feb. 23, 1973, Pat. No. 921,024.

[52] U.S. Cl. .............................. 423/313; 423/315
[51] Int. Cl. .................. C01b 15/16; C01b 25/26
[58] Field of Search .................. 423/307–315, 423/321; 71/34, 43

[56] References Cited
UNITED STATES PATENTS
3,408,158    10/1968    Dyroff et al. .................. 423/321

FOREIGN PATENTS OR APPLICATIONS
3,811,105    12/1961    Japan ............................ 423/321

*Primary Examiner*—Oscar R. Vertiz
*Assistant Examiner*—Gregory A. Heller

[57] ABSTRACT

Embodiment No. 1—Purified alkali metal or ammonium orthophosphates are prepared by adding melamine to impure wet-process phosphoric acid to form crystals of insoluble melamine orthophosphate which are separated from the mother liquor and caused to react with an aqueous solution of alkali metal or ammonium hydroxide or a salt thereof with an unstable volatile anion which is evolved as a gas from the solution, thereby forming crystals of melamine for recycle and a solution of the desired purified orthophosphate.

Embodiment No. 2—Alkali metal or ammonium pyrophosphates are prepared by heating melamine orthophosphate (prepared as for example in embodiment No. 1 supra) at 200° to 300°C to convert it to melamine pyrophosphate and allowing it to react with an aqueous solution of alkali metal or ammonium hydroxide or a salt thereof containing an unstable volatile anion which is evolved as a gas from the solution, thereby forming crystals of melamine for recycle and a solution of the desired pyrophosphate. Relatively pure pyrophosphates are obtained from impure wet-process orthophosphoric acid.

7 Claims, 4 Drawing Figures

PREPARATION OF AMMONIUM PHOSPHATE
BY MELAMINE RECYCLE

PREPARATION OF AMMONIUM PYROPHOSPHATE
BY MELAMINE RECYCLE

RATE OF CONDENSATION OF MELAMINE ORTHOPHOSPHATE

ARRHENIUS PLOT OF CONDENSATION OF MELAMINE ORTHOPHOSPHATE

METHOD OF PREPARING PURIFIED PHOSPHATES FROM IMPURE PHOSPHORIC ACID

The invention herein described may be manufactured and used by or for the Government for governmental purposes without the payment to me of any royalty therefor.

This application is a continuation of may copending application Ser. No. 355,377, filed Feb. 23, 1973, for METHOD OF PREPARING PURIFIED PHOSPHATES FROM IMPURE PHOSPHORIC ACID, now T 921,024.

The present invention provides a new and improved method of recovering relatively pure alkali metal or ammonium orthophosphates from relatively impure wet-process phosphoric acid (IWPA) and a new and simplified method of manufacturing alkali metal or ammonium pyrophosphates preferably from such impure wet-process orthophosphoric acid. According to the present invention, melamine is added to IWPA, in the preferred embodiment particularly from an economic consideration, to form crystals of insoluble melamine phosphate which are separated from the mother liquor and subsequently caused to react with an aqueous solution of alkali metal or ammonium hydroxide or salt thereof with an unstable volatile anion which is evolved as a gas from the solution, thereby forming crystals of melamine and a solution of the desired alkali metal or ammonium orthophosphate. Crystals of substantially pure alkali metal or ammonium orthophosphate are obtained by cooling the concentrated solution by addition of a miscible solvent such as alcohol or acetone, or by any other suitable method known in the art. The result is a new and unique process for the manufacture of purified alkali metal or ammonium orthophosphates from IWPA with complete recycle of the melamine.

In another embodiment of the present invention, the melamine orthophosphate prepared supra is converted to melamine pyrophosphate by heating same at 200° to 300°C and subsequently caused to react with an aqueous solution of alkali metal or ammonium hydroxide or a salt thereof with an unstable volatile anion which is evolved as a gas from the solution, the resulting crystals of melamine filtered off, and the desired pyrophosphate then recovered by precipitation with alcohol or by evaporation and crystallization. The result, surprisingly, is a novel method for the manufacture of pure alkali metal or ammonium pyrophosphates from either reagent-grade orthophosphoric acid, or more preferably, relatively pure alkali metal or ammonium pyrophosphates from impure wet-process orthophosphoric acid with complete recycle of the melamine in either case.

At the present time, a variety of solid fertilizers are manufactured by utilizing IWPA and ammonia. The numerous congeneric impurities present in such acids are usually not bothersome in solid fertilizers since such compositions are applied in dry form by commercial applicators or spreaders. Such impurities find their way into the IWPA from the phosphate rock ore that is acidulated, usually with sulfuric acid, to win therefrom the $P_2O_5$ values therein. It is generally considered that such congeneric impurities comprise from about 1 to about 10 percent of said acid by weight. Of these impurities, iron and aluminum are considered the most undesirable with magnesium not far behind. Also troublesome is fluorine and combustion materials. However, IWPA has not yet met with widespread success in manufacturing liquid fertilizers since the iron, aluminum, fluorine, and various other congeneric impurities in the acid react with the phosphates that are formed as the acid is neutralized with the ammonia and unfortunately form insoluble precipitates or gelatinous sludges which settle out of the solution and readily clog nozzles and spray orifices in application equipment. To avoid this difficulty, relatively expensive pure electric furnace type phosphoric acid derived from the hydrolysis of $P_2O_5$ derived from elemental phosphorus is ordinarily used to make liquid fertilizers. Elemental phosphorus is relatively expensive to produce and so is the acid produced therefrom. Several workers have proposed schemes for the purification of such IWPA involving the use of calcined rock, solvent extraction, or both, to produce a high-quality phosphoric acid. However, these schemes suffer from a number of serious drawbacks as outlined in "Phosphoric Acid," Volume 1, A. V. Slack, pages 709–710 (1968).

Still other investigators have attempted to purify IWPA by allowing it to react with urea so that the crystalline adduct urea phosphate is produced. Urea phosphate dissociates in solution to urea and phosphoric acid, but no way has been found to separate the two compounds. Furthermore, ammoniation of the acid leads to a mixture of urea and ammonium phosphate which is difficult and impractical to separate due to the high solubility of these materials. Urea phosphate can be heated to convert it to a mixture of short-chain ammonium polyphosphates, but in this case the urea is destroyed by conversion to ammonia and carbon dioxide.

The present invention overcomes these drawbacks because the sparingly soluble melamine is easily separated from the product orthophosphate or pyrophosphate. Furthermore, the melamine is stable at the temperatures practiced in my invention and is recovered in substantially 100 percent yield for recycle.

I have now discovered that melamine orthophosphate, when precipitated from IWPA solution, is free from most of the impurities normally associated with IWPA. Furthermore, I have found that the thus-produced melamine orthophosphate, when suspended in water and treated with alkali metal or ammonium hydroxide, is converted quantitatively to alkali metal or ammonium orthophosphates eminently suitable for use in either liquid or solid fertilizers. Another advantage of my new and unique process, as pointed out supra, is that the melamine is recovered in essentially 100 percent yield for regeneration of melamine orthophosphate by reaction with additional IWPA. Thus, the only raw materials required in my new and unique process are IWPA and alkali metal or ammonium hydroxide or suitable salts thereof.

The reactions involved in my process for the manufacture of purified orthophosphates are illustrated by the following equations:

$$C_3H_6N_6 + H_3PO_4 = C_3H_9N_6PO_4 \qquad 1$$

$$C_3H_9N_6PO_4 + 2NH_3 = (NH_4)_2HPO_4 + C_3H_6N_6 \qquad 2$$

it being understood that the degree of neutralization may be controlled to yield mono-, di-, or tribasic orthophosphates.

Prior-art methods for the preparation of alkali metal or ammonium pyrophosphates are known. For example, tetrasodium pyrophosphate and disodium pyrophosphate can be prepared by thermal dehydration of sodium orthophosphates because the sodium ion is stable and does not volatilize from the reaction mixture. Tetrapotassium pyrophosphate was obtained similarly by dehydration of potassium orthophosphate. It has also been made from potassium hydroxide and 78 to 81 percent $P_2O_5$ polyphosphoric acid of the electric furnace type according to the teachings of R. L. Copson in U.S. Pat. No. 3,325,244.

Ammonium pyrophosphates cannot be made by thermal dehydration of orthophosphates because both water and ammonia are split off and the resulting product is a mixture of short-chain ammonium polyphosphates and shortchain ammonium polyphosphoric acids. This mixture is tacky, hygroscopic, plastic, and difficult to handle or store. Thus, it is necessary to prepare ammonium pyrophosphates by ammoniation of pure pyrophosphoric acid (C. Swanson and F. McCullough, Inorganic Syntheses 7, 65, 1963); this acid is difficult and costly to prepare and is commercially unavailable. Other procedures for the preparation of ammonium pyrophosphate were patented in J. R. Lehr (see U.S. Pat. No. 3,362,785) who obtained it by metathesis of calcium pyrophosphate and ammonium fluoride, and by T. P. Hignett and J. G. Getsinger (U.S. Pat. No. 3,264,085), who produced it by pressure ammoniation of polyphosphoric acid containing 78 to 80 percent $P_2O_5$. Lehr's process converts relatively expensive ammonium fluoride to a cheap and undesirable product, and the use of highly concentrated polyphosphoric acid requires the use of elemental phosphorus which is now too expensive for widespread use in the fertilizer industry.

Several new and advantageous features over the existing processes for the production of alkali metal and ammonium pyrophosphates shown in the prior art are realized by the present invention. Among these are (1) it utilizes inexpensive and readily available orthophosphoric acid, including impure wet-process acid; (2) it produces very high yields with essentially no by-products other than water when alkali metal or ammonium hydroxides are used; (3) the product prepared from wet-process acid is highly suitable for use in solid or liquid fertilizers, and in the instance wherein the product is made from pure acid, it is pure enough for both laboratory studies and commercial use; (4) the melamine is recycled so that the only raw materials are the neutralizing agent and orthophosphoric acid; (5) dilute orthophosphoric acid, such as filter-grade wet-process acid containing only about 30 percent $P_2O_5$, may be utilized as a raw material; (6) the process operates at atmospheric pressure; and (7) it may be utilized to produce sodium, potassium, or ammonium pyrophosphates as desired.

The reactions involved in my process for the manufacture of pyrophosphates are illustrated by the following equations:

1

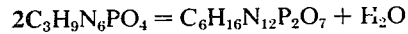

2

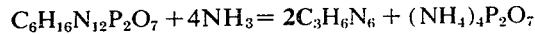

3

It is therefore an object of the present invention to produce economically purified alkali metal or ammonium orthophosphates from inexpensive IWPA. A further object of this invention is to produce highly pure or relatively pure alkali metal or ammonium pyrophosphates from orthophosphoric acid.

Another object of the present invention is to provide orthophosphates and pyrophosphates which are highly suitable for the manufacture of high grade liquid fertilizers.

A further object of the present invention is to provide a process which utilizes only phosphoric acid and the neutralizing agent as raw materials for the production of purified orthophosphates and pyrophosphates.

Still another object of the present invention is to produce ammonium, sodium, potassium, or other alkali metal salts of orthophosphoric and pyrophosphoric acid as desired merely by using the appropriate neutralizing agent.

My invention, together with further objects and advantages thereof, will be better understood from a consideration of the following description taken in connection with the accompanying drawings in which.

Figure 1:
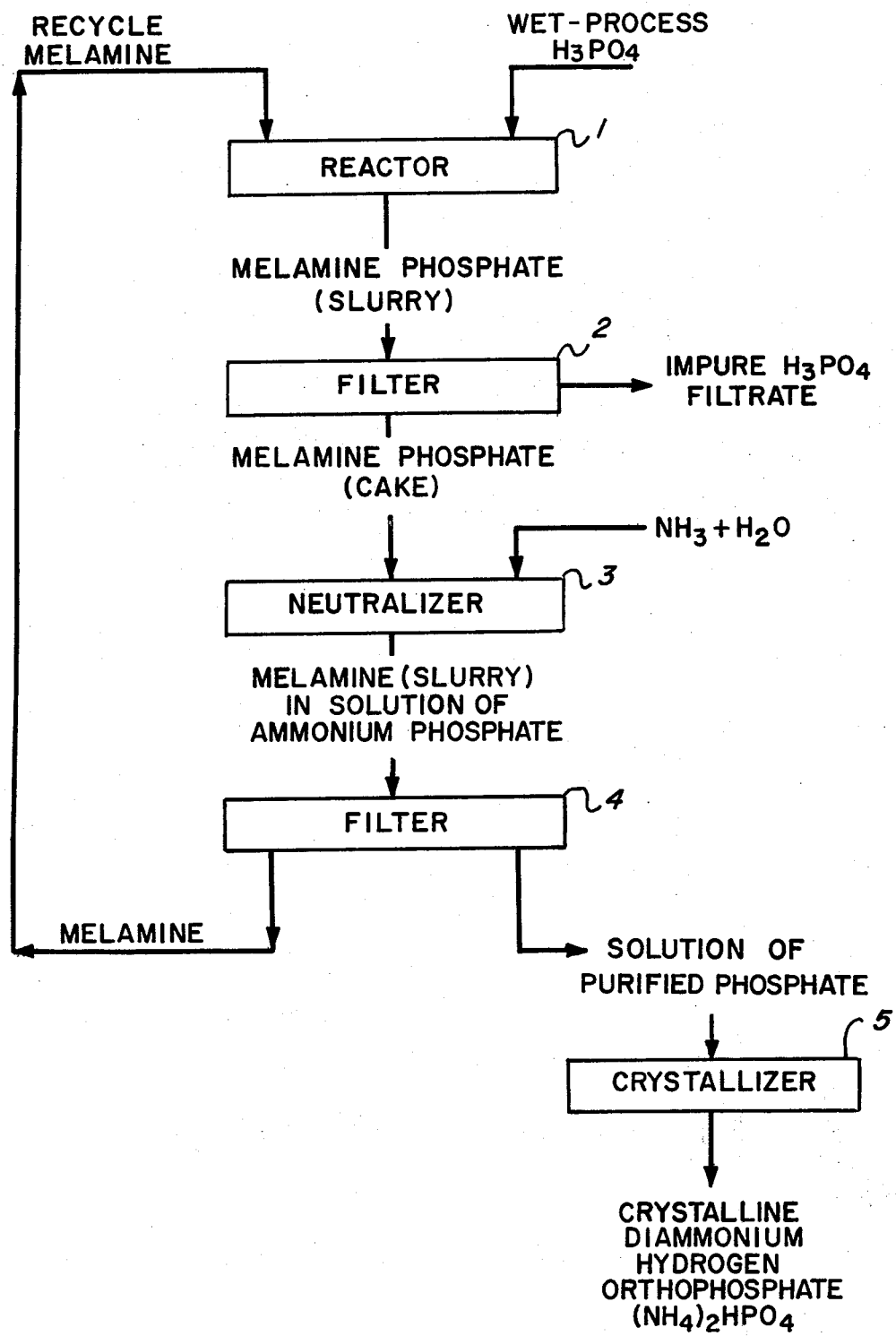
FIG. 1 represents a flowsheet in box form generally illustrating the principles of my new and novel process for the manufacture of alkali metal or ammonium orthophosphate.

Referring now more specifically to FIG. 1, 1 represents any vessel suitable for containing the reaction mixture of melamine and IWPA during the reaction period. The slurry from reaction vessel 1 is fed to filter 2 where the mother liquor containing the impurities is separated from the crystals of melamine phosphate. Subsequently, the melamine phosphate is neutralized with aqueous ammonia in reaction vessel 3. The resulting mixture of solid crystalline melamine suspended in the solution of ammonium orthophosphate is fed to filter 4 where the melamine is recovered for recycle to reactor 1. The filtrate from 4 is fed to any suitable container 5 for the crystallization of product diammonium dihydrogen phosphate.

Figure 2:
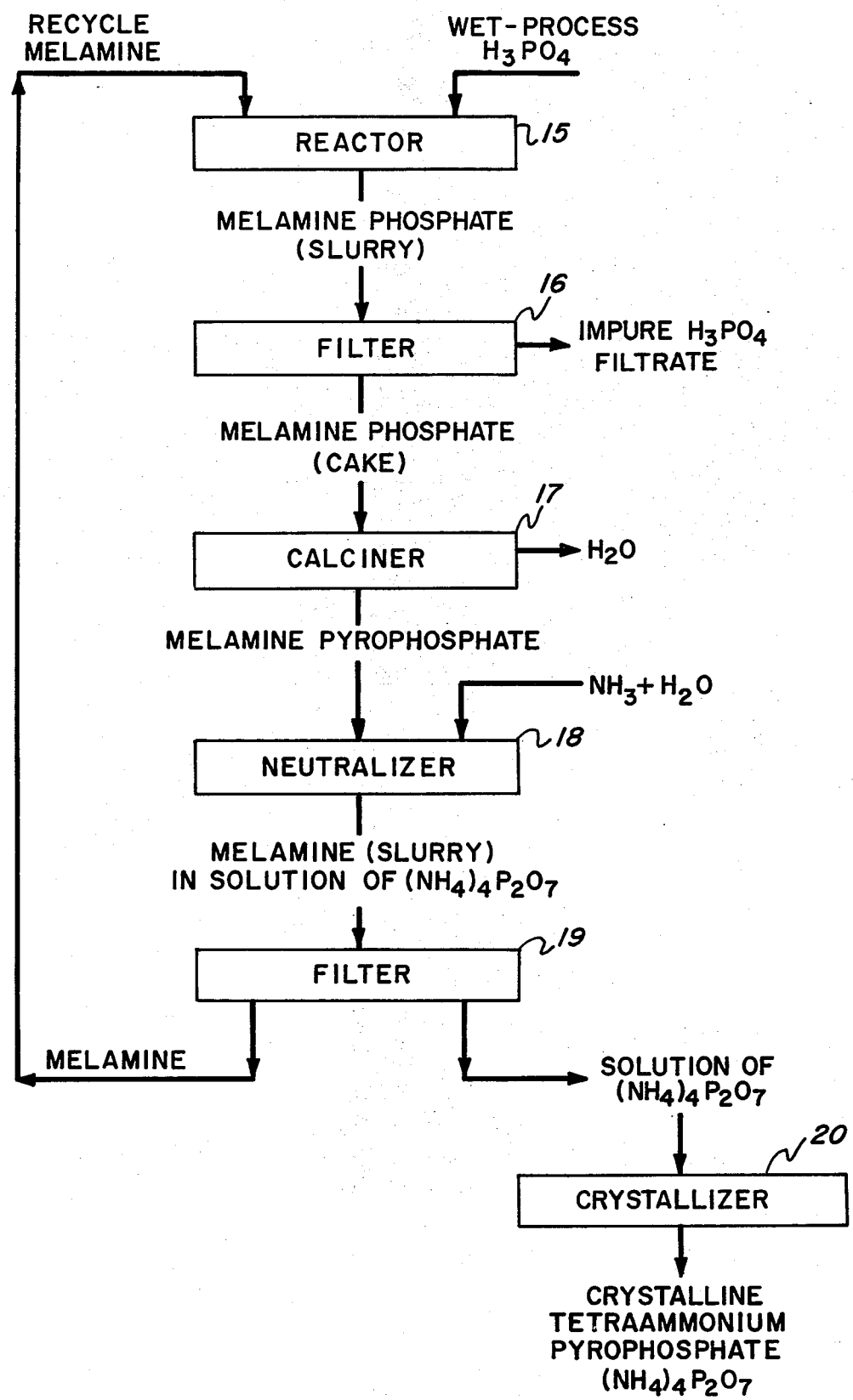
FIG. 2 represents a flowsheet in box form generally illustrating the principles of my new and novel process for the manufacture of alkali metal or ammonium pyrophosphate.

Referring now more specifically to FIG. 2, 15 represents any vessel suitable for containing the reaction mixture of melamine and orthophosphoric acid during the reaction period. The slurry from reaction vessel 15 is fed to a filter 16 where the mother liquor is separated from the insoluble crystalline malamine phosphate. Subsequently, the melamine phosphate is passed through a calciner 17 where water of composition is expelled and melamine pyrophosphate is formed by condensation of the orthophosphate. After cooling, the melamine pyrophosphate is reacted with a neutralizing agent such as aqueous ammonia in any suitable vessel 18. The melamine is regenerated as the ammonium pyrophosphate solution is produced, and the resulting slurry or suspension of melamine is fed to filter 19 where the melamine is collected for recycling to reactor 15. The filtrate ammonium pyrophosphate solution is fed to any suitable container 20 for crystallization of the product tetraammonium pyrophosphate.

Figure 3:
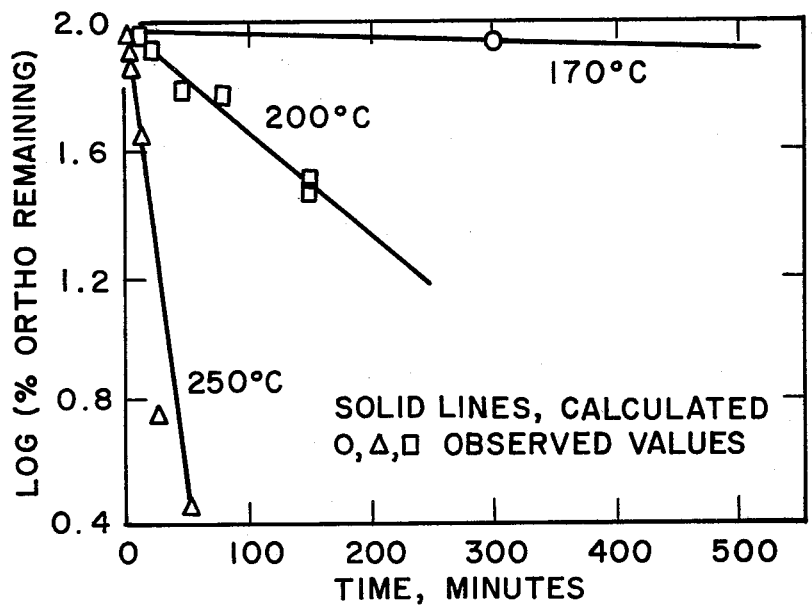
FIG. 3 represents a log plot representing the rate of condensation of melamine orthophosphate at various temperatures.
Figure 4:
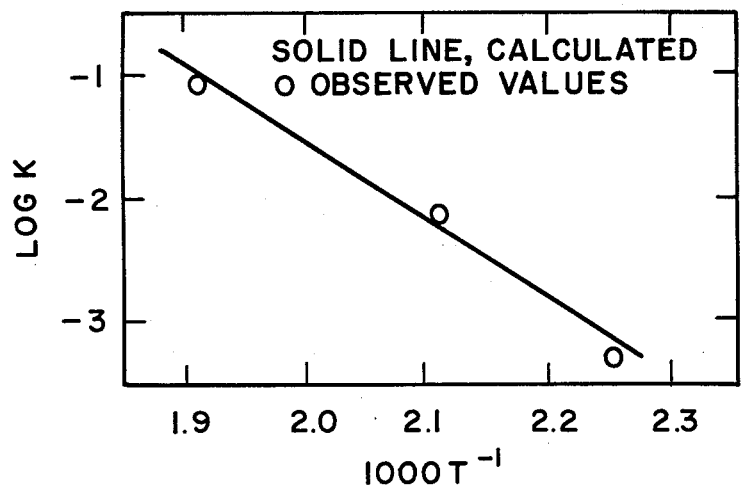
FIG. 4 represents an Arrhenius plot of condensation of melamine orthophosphate.

For convenience, more specific reference to FIGS. 3 and 4 is made in the paragraph supra and in Example II, tables I and II, infra.

After sifting and winnowing through the data presented in the examples infra, the FIGURES, as well as other data which I have assembled in discovering and developing my invention, I have determined that the operable parameters and preferred embodiments of my invention are as follows:

The mole ratio of phosphoric acid calculated as $H_3PO_4$ to melamine is preferably 1:1 and 2:1, and the process is operable over the range 1:1 and 6.5:1. The mole ratios supra, when the acid is calculated as $P_2O_5$, are halfed, i.e., preferably 1:2 to 1:1 and operably 1:2 to 3.25:1. An excess of acid is desirable to keep the impurities in solution and to convert all of the melamine to melamine phosphate.

The most preferred concentration of $P_2O_5$ in the phosphoric acid is that of filter grade, i.e., about 30 percent, and the operable concentration may range from about 10 to about 60 percent, and preferably 20–40 percent. At the higher concentration, i.e., above about 40, it may be desirable to add water to aid in mixing and filtering.

The temperature at which melamine phosphate is crystallized is operable from 0° to 100°C, preferably 40° to 60°C.

The mole ratio of alkali metal or ammonium hydroxide or suitable salt to melamine phosphate is preferably in the range 2:1 to 4:1, and the operable range is 1:1 to 8:1.

The temperature at which melamine phosphate is treated with alkali metal or ammonium hydroxide may range from 0° to 100°C, but the preferred range is 20° to 30°C, or substantially room temperature. When melamine phosphate is treated with a suitable carbonate, sulfite, or sulfide, a higher temperature (about 40°–50°C) is preferred to expel the gaseous byproduct.

The temperature at which melamine orthophosphate is converted to melamine pyrophosphate may range from 170° to 325°C, but the preferred range is 250° to 280°C.

The time of heating depends on the temperature; at 170°C, about 4400 minutes is required; at 250°C about 25 minutes is required; at 275° to 280°C, the reaction is rapid, and the time of 5 minutes or less is sufficient to complete the conversion to pyrophosphate.

The mole ratio of alkali metal or ammonium hydroxide to melamine pyrophosphate is preferably in the range 4:1 to 6:1 and the operable range is 2:1 to 10:1. The temperature at which melamine pyrophosphate is treated with alkali metal or ammonium hydroxide may range from 0° to 100°C, but the preferred range is 20° to 30°C, or substantially room temperature. If melamine pyrophosphate is treated with alkali metal or ammonium carbonate, sulfite, or sulfide, a slightly higher temperature (about 40°–50°C) is desirable to expel the gaseous byproduct.

The wet-process acid residue after removal of the melamine phosphate which contains a high percentage of impurities can be used in crystallization of melamine phosphate again until the concentration of said impurities become so high as to contaminate the melamine phosphate. It can then be used as a solid fertilizer ingredient, thus recovering whatever phosphorus value remains in the liquor.

In order that those skilled in the art may better understand how the present invention can be practiced, the following examples are given by way of illustration and not by way of limitation.

EXAMPLE I 98.5 grams of black wet-process phosphoric acid ($H_3PO_4$) analyzing 54.1 percent $P_2O_5$, 0.72 percent Al, 1.1 percent Fe, 0.18 percent Mg, and 0.9 percent F (all percentages by weight) was diluted with 79.0 grams of water to give an acid containing 30.0 percent $P_2O_5$. Melamine (63.0 grams) was added with stirring to the phosphoric acid at about room temperature, thus providing a mole ratio of $H_3PO_4$ to melamine of substantially 1.5:1. The temperature rose to 56°C and melamine phosphate crystallized. The product was filtered off and dried yielding 112.0 grams and containing 30.0 percent $P_2O_5$, 0.16 percent Al, 0.19 percent Fe, 0.05 percent Mg, and 0.23 percent F. The melamine phosphate was then treated with 100 ml. of concentrated ammonium hydroxide at room temperature (about 25°C). The crystallized melamine (62.8 grams) was filtered off for recycle, and the recovery of melamine was essentially 100 percent. The filtrate was treated with methyl alcohol to induce crystallization, and the product ammonium orthophosphate was collected by filtration. After drying, the product weighed 65.0 grams and it was identified as diammonium orthophosphate by x-ray diffraction analysis. Chemical analysis showed that the product contained 53.3 percent $P_2O_5$, 20.7 percent N, and 0.10 percent Fe, 0.03 percent Al, 0.001 percent Mg, and 0.02 percent F; the theoretical composition of pure diammonium orthophosphate is 53.74 percent $P_2O_5$ and 21.21 percent N.

EXAMPLE II

The rate of condensation of melamine orthophosphate was measured at 170°, 200°, and 250°C by heating 1-gram samples for periods in the range from 4 to 1710 minutes. The products were analyzed by quantitative paper chromatography, and the distribution of phosphate species is shown in table I, infra. Plots of the logarithm of the orthophosphate fraction against time were straight lines at each of the three temperatures, as shown in FIG. 3. The condensation of melamine orthophosphate thus is a first-order reaction. The data were treated by the method of least squares to calculate the specific rate constants, K, and the half-lives for the condensation. The results are shown in table II, infra.

Table I

| | Condensation of Melamine Orthophosphate | | |
|---|---|---|---|
| Time, min. | Temp., °C | Distribution, %, of total phosphorus | | |
| | | Ortho | Pyro | Other |
| 300 | 170 | 92.0 | 6.7 | 1.3 |
| 930 | | 76.4 | 22.1 | 1.4 |
| 1710 | | 47.3 | 51.5 | 1.2 |
| 10 | 200 | 95.8 | 4.2 | 0.0 |
| 22.5 | | 88.3 | 11.7 | 0.0 |
| 40 | | 65.6 | 31.2 | 3.3 |
| 80 | | 64.0 | 34.2 | 1.8 |
| 150 | | 31.1 | 66.9 | 2.0 |
| 4 | 250 | 94.3 | 3.7 | 1.9 |
| 6 | | 80.6 | 17.3 | 2.2 |
| 12 | | 49.3 | 48.5 | 2.2 |
| 25 | | 5.7 | 91.8 | 2.5 |
| 50 | | 2.9 | 92.4 | 4.7 |

Table II

Specific Rate Constants and Half-Lives in Condensation of Melamine Orthophosphate

| Temperature, °C | Rate constant, K | Half-life, min. |
|---|---|---|
| 170 | $4.77 \times 10^{-4}$ | 1453 |
| 200 | $7.63 \times 10^{-3}$ | 91 |
| 250 | $8.01 \times 10^{-2}$ | 8.7 |
| 260" | $1.61 \times 10^{-1}$ | 4.3 |
| 270" | $2.69 \times 10^{-1}$ | 2.6 |
| 280" | $4.34 \times 10^{-1}$ | 1.6 |
| 290" | $6.95 \times 10^{-1}$ | 1.0 |
| 325" | 3.80 | 0.18 |

"Calculated by Arrhenius equation.

A plot of log K vs. 1/T, essentially a straight line, as predicted by the Arrhenius equation, is shown in FIG. 4. From the slope of this line, the energy of activation, E*, was calculated to be 29.1 kcal/mole.

The condensation of melamine orthophosphate proceeds slowly at 170°C, but the rate increases rapidly with increasing temperature. The half-life is 8.7 minutes at 250°C, and decreases to about 1 minute at 290°C. No melamine is decomposed at 250°C and only 2 to 3 percent of the phosphate is condensed to species greater than pyrophosphate at temperatures below about 275°C. At higher temperatures, a mixture of polyphosphates was formed and ammonia was expelled from the sample.

EXAMPLE III 146.6 grams of reagent-grade 85 percent orthophosphoric acid was diluted with 300 grams of water (yielding a 20-percent $P_2O_5$ starting acid) and mixed with 126.0 grams of melamine. The temperature rose from 25° to 52°C, and melamine orthophosphate crystallized. It was collected, washed, and dried, yielding 222.0 grams or 98 percent of the theoretical value. Optical microscopy identified the product as melamine orthophosphate, and chemical analysis showed that it contained 37.3 percent N and 31.8 percent $P_2O_5$ (theoretical values are 37.5 percent N and 31.7 percent $P_2O_5$). The melamine orthophosphate was heated at 250°C for 1.0 hour to condense it to pyrophosphate. The charge lost 4.1 percent of its weight (theoretical weight loss, 4.0 percent) and it was identified as melamine pyrophosphate by optical microscopy and chemical analysis (found: 38.6 percent N, 32.9 percent $P_2O_5$; theoretical: 39.0 percent N, 32.9 percent $P_2O_5$). 43.0 grams of melamine pyrophosphate was treated with 50 ml of concentrated ammonium hydroxide at room temperature. The mixture was filtered to remove the crystalline melamine (23.9 grams, 95 percent recovery) and the filtrate was diluted with methyl alcohol to induce crystallization of the ammonium pyrophosphate. The dried product weighed 23.5 grams and represented a yield of 95 percent. It was identified as $(NH_4)_3HP_2O_7 \cdot H_2O$ by optical microscopy and x-ray diffraction analysis, and paper chromatography revealed that over 95 percent of the phosphorus was in the form of pyrophosphate.

EXAMPLE IV 98.5 grams of black wet-process phosphoric acid ($H_3PO_4$) analyzing 54.1 percent $P_2O_5$, 2.7 percent $SO_4$, 0.72 percent Al, 0.18 percent Mg, and 0.9 percent F (all percentages weight percent) was diluted with 79.0 grams of water to give an acid containing 30.0 percent $P_2O_5$. Melamine (63.0 grams) was reacted with the acid at about 55°C, and the crystallized, dried melamine orthophosphate weighed 112.1 grams. It was heated in an oven at 250°C for 1.0 hour to produce melamine pyrophosphate (106.5 grams) which was treated with concentrated ammonium hydroxide (75 ml). The crystalline melamine (62.7 grams) was collected by filtration, and the filtrate was diluted with methyl alcohol to induce crystallization of the product ammonium pyrophosphate (62.0 grams) which was identified by x-ray diffraction and optical microscopy as a mixture of about 75 percent $(NH_4)_4P_2O_7$ and about 25 percent $(NH_4)_4P_2O_7 \cdot H_2O$. Paper chromatography showed that 85 percent of the total phosphorus was present as pyrophosphate. Chemical analysis revealed that the product contained 53.1 percent $P_2O_5$, 0.27 percent Al, 0.02 percent F, and <0.1 percent $SO_4$.

While I have shown and described particular embodiments of my invention, modifications and variations thereof will occur to those skilled in the art. I wish it to be understood therefore that the appended claims are intended to cover such modifications and variations which are within the true scope and spirit of my invention.

What I claim as new and desire to secure by letters patent of the United States is:

1. A process for manufacturing purified alkali metal or ammonium orthophosphates, which process comprises the steps of:
    1. mixing in the mole ratio range from about 1:2 to about 3.25:1 impure wet-process orthophosphoric acid and melamine, calculated as $P_2O_5$:melamine, said orthophosphoric acid containing from about 1 to about 10 percent by weight congeneric impurities and from about 10 to about 60 percent by weight $P_2O_5$ to form in a mother liquor crystals of melamine orthophosphate;
    2. separating the so formed crystals of melamine orthophosphate from said mother liquor;
    3. subsequently reacting said crystals of melamine orthophosphate separated from said mother liquor with aqueous solution, said aqueous solution selected from the group consisting of alkali metal hydroxide, ammonium hydroxide, and mixtures thereof, in the mole ratio range of hydroxide:melamine orthophosphate of about 1:1 to about 8:1; and
    4. separating the resulting crystals of melamine precipitated by the reaction of said hydroxide with said melamine orthophosphate in step (3) supra for recycle to step (1) supra, and recovering the resulting purified alkali or ammonium orthophosphate from the filtrate formed in step (3) supra, as product.

2. A process for manufacturing purified alkali metal or ammonium pyrophosphates, which process comprises the steps of:
    1. mixing in the mole ratio range from about 1:2 to about 3.25:1 impure wet-process orthophosphoric acid and melamine, calculated as $P_2O_5$:melamine, said orthophosphoric acid containing from about 1 to about 10 percent by weight congeneric impurities and from about 10 to about 60 percent by weight $P_2O_5$ to form in mother liquor crystals of melamine orthophosphate;
    2. separating the so formed crystals of melamine orthophosphate from said mother liquor;
    3. heating said recovered crystals of melamine orthophosphate to a temperature in the range from about 170°C to about 325°C for a period of time ranging from about 4400 minutes to about 1 minute, thereby converting said crystals of melamine orthophosphate to resulting solid melamine pyrophosphate;

4. subsequently reacting said resulting melamine pyrophosphate with aqueous solution selected from the group consisting of alkali metal hydroxide, ammonium hydroxide, and mixtures thereof, in the mole ratio range of hydroxide:melamine pyrophosphate of about 2:1 to about 10:1; and 5. separating the resulting crystals of melamine precipitated by the reaction of said hydroxide with said melamine pyrophosphate in step (3) supra for recycle to step (1) supra, and recovering the resulting purified alkali or ammonium pyrophosphate from the filtrate formed in step (3) supra, as product.

3. The method of claim 1 wherein said aqueous solution is selected from the group consisting of alkali metal or ammonium sulfates, sulfides, carbonates, and mixtures thereof.

4. The process of claim 2 wherein said aqueous solution is selected from the group consisting of alkali metal or ammonium sulfites, sulfides, carbonates, and mixtures thereof.

5. The process of claim 1 wherein (a) the concentration of said impure wet acid ranges from about 20 to about 40 percent $P_2O_5$; (b) the mole ratio of said impure wet acid, said acid calculated as $P_2O_5$ to said melamine, ranges from about 1:2 to about 1:1; (c) the mole ratio of said hydroxide to said melamine phosphate is in the range from about 2:1 to about 4:1.

6. The process of claim 2 wherein (a) the concentration of said impure wet acid ranges from about 20 to about 40 percent $P_2O_5$; (b) the mole ratio of said impure wet acid, said acid calculated as $P_2O_5$ to said melamine, ranges from about 1:2 to about 1:1; (c) the mole ratio of said hydroxide to said melamine pyrophosphate is in the range from about 4:1 to about 6:1.

7. The process of claim 6 in which said temperature and residence time in step (3) is in the range from about 250°C to about 280°C and from about 25 minutes to about 5 minutes, respectively.

* * * * *